United States Patent [19]

Orlando

[11] Patent Number: 5,311,735
[45] Date of Patent: May 17, 1994

[54] RAMJET BYPASS DUCT AND PREBURNER CONFIGURATION

[75] Inventor: Robert J. Orlando, West Chester, Ohio

[73] Assignee: General Electric Company, Cincinnati, Ohio

[21] Appl. No.: 58,182

[22] Filed: May 10, 1993

[51] Int. Cl.$^5$ .............................................. F02K 3/11
[52] U.S. Cl. ....................................... 60/204; 60/225; 60/244; 60/263
[58] Field of Search ................ 60/204, 224, 226.1, 60/226.3, 244, 262, 263, 225

[56] References Cited

U.S. PATENT DOCUMENTS

| | | |
|---|---|---|
| 3,002,352 | 10/1961 | Helfrich et al. . |
| 3,087,301 | 4/1963 | Mulready et al. . |
| 3,161,018 | 12/1964 | Sandre .................. 60/262 |
| 3,172,253 | 3/1965 | Schelp et al. . |
| 3,238,716 | 3/1966 | Sandre .................. 60/262 |
| 3,368,352 | 2/1968 | Hewson . |
| 3,677,012 | 7/1972 | Batscha ................. 60/263 |
| 3,693,354 | 9/1972 | Hull, Jr. . |
| 3,834,161 | 9/1974 | Quigley, Jr. et al. . |
| 3,987,621 | 10/1976 | Sabatella et al. ...... 60/262 |
| 3,999,378 | 12/1976 | Tatem, Jr. et al. . |
| 4,003,201 | 1/1977 | Lewis et al. .......... 60/262 |
| 4,043,121 | 8/1977 | Thomas et al. . |
| 5,012,638 | 5/1991 | Grieb et al. . |

Primary Examiner—Louis J. Casaregola
Attorney, Agent, or Firm—Jerome C. Squillaro; Nathan D. Herkamp

[57] ABSTRACT

A combined turbofan and ramjet aircraft engine includes a forward bypass duct which allows the engine to operate more efficiently during the turbofan mode of operation. By mounting a ramjet preburner in the forward duct and isolating this duct from the turbofan bypass air, a transition from turbofan operation to ramjet operation can take place at lower flight Mach numbers without incurring pressure losses or blockage in the turbofan bypass air.

10 Claims, 3 Drawing Sheets

RAMJET BYPASS DUCT AND PREBURNER CONFIGURATION

BACKGROUND OF THE INVENTION

Rights of the Government

The invention herein described was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

The present invention relates in general to jet engines which operate in a turbofan mode at lower flight speeds and in a ramjet mode at higher flight speeds. The invention relates in particular to a preburner located in a forward bypass duct surrounding the turbofan.

DESCRIPTION OF PRIOR DEVELOPMENTS

In order to reach flight speeds in the range of Mach 4 to Mach 6, current aircraft jet engine designs have combined turbofan operation with ramjet operation. This approach requires the engine to transition from turbofan operation to ramjet operation somewhere in the range of flight speeds between Mach 3 and Mach 4.

At the lower end of transition flight speeds around Mach 3, a preburner is generally required to preheat the bypass air which is fed to an augmenter or afterburner during the initiation of ramjet operation. This preheating is required to support and maintain reasonable combustion efficiencies in the ramjet.

A drawback associated with conventional preburners is that, during turbofan operation, the presence of the preburners in the main bypass duct presents an obstacle to the bypass airflow and thereby creates an undesirable pressure drop. Such a pressure drop can have a significant negative impact on turbofan performance. It is, of course, possible to eliminate the pressure drop by eliminating the preburner.

However, in order to eliminate the preburner, a higher flight Mach number is required to transition effectively from turbofan operation to ramjet operation. That is, the temperature of the inlet air increases with flight speed in the range of Mach 3 so that a preburner is not needed to preheat the bypass air fed to the augmenter during the transition from turbofan operation to ramjet operation at higher flight speeds.

Unfortunately, by increasing the flight speed at which the engine transitions from turbofan operation to ramjet operation, the turbofan compression system must be designed to withstand the higher inlet air temperatures. This places severe demands on the design and operation of the turbofan which demands designers typically prefer to avoid.

Accordingly, a need exists for a dual mode turbofan-ramjet engine which provides a preburner for lowering the flight speed at which transition from turbofan to ramjet operation takes place, yet which minimizes the pressure drop in bypass airflow through a turbofan bypass duct during turbofan operation.

SUMMARY OF THE INVENTION

The present invention has been developed to fulfill the needs noted above and therefore has as an object the provision of a turbofan-ramjet engine which effectively transitions from turbofan operation to ramjet operation at flight speeds around Mach 3 without experiencing a loss in bypass air pressure during turbofan operation. By transitioning to ramjet operation at lower flight speeds, the aerodynamic loading and heating of the turbofan compression system may be reduced. This allows for the use of lower temperature materials in the turbofan compression system.

Another object of the invention is to provide a ramjet preburner in a secondary bypass duct which surrounds the turbofan in such a manner that the turbofan engine can operate at subsonic and low supersonic speeds without experiencing a loss in bypass air pressure.

Another object of the invention is to provide a secondary outer bypass duct around the fan and front frame of a turbofan-ramjet engine in such a manner that this duct completely bypasses the fan of the turbofan engine. By mounting a ramjet preburner in this duct, the turbofan does not experience any pressure loss in its bypass air.

Another object of the invention is to construct a ramjet preburner as an integral part of a front frame bypass duct so as to increase the mixing length between the preburner and augmenter. By increasing the mixing length over which the heated inlet air is mixed, smaller, more compact preburners may be employed.

Yet another object of the invention is to integrate a ramjet preburner with the front frame struts of a turbofan-ramjet engine so as to minimize the weight, complexity and pressure drop attributed to the preburner.

Still another object of the invention is to incorporate a preburner into the trailing edges of the front frame struts of a turbofan-ramjet engine and to contour the struts with an airfoil configuration so as to import a swirl to the preheated bypass air. Such a swirl increases the effective mixing length of the preheated air allowing for a lighter and simpler preburner design. Moreover, because a longer mixing length allows for a smaller preburner, less blockage and pressure drop of bypass air occurs during ramjet operation.

Briefly, the invention is directed to a turbofan-ramjet engine which includes an outer secondary bypass air duct which surrounds and bypasses the fan of the turbofan engine. A ramjet preburner is mounted in this secondary bypass duct as an integral part of the front frame. Inlet air is admitted into the secondary bypass duct only during ramjet operation so that no drop in bypass air pressure can be attributed to the preburner during turbofan operation.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
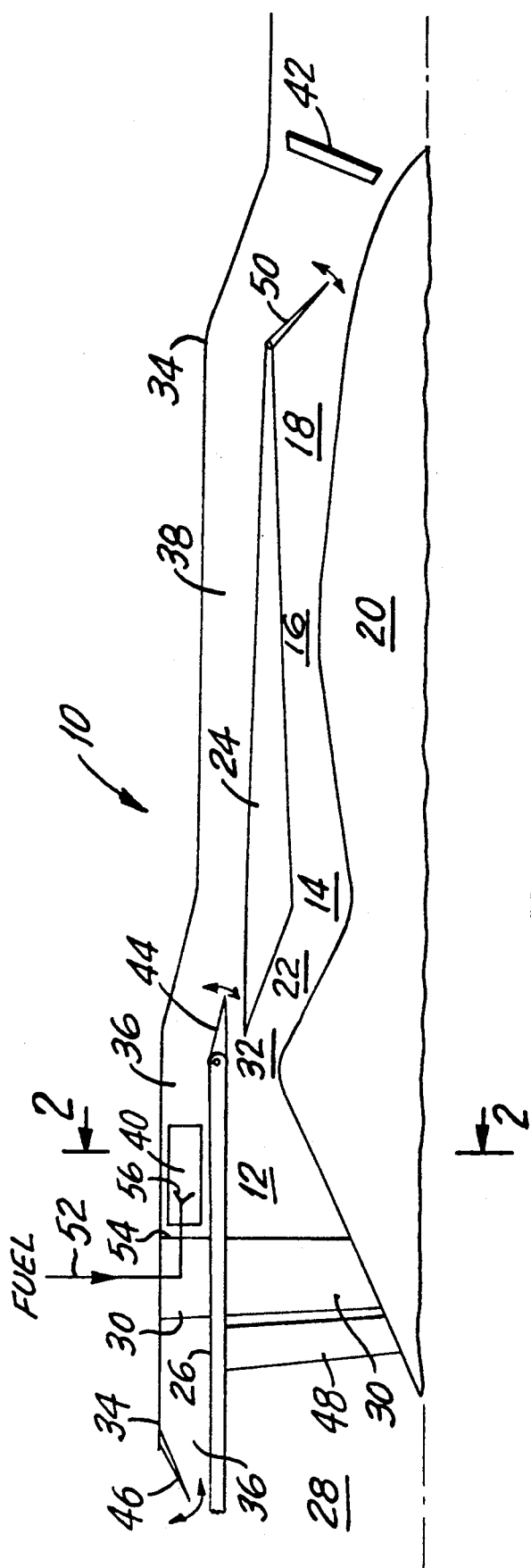
FIG. 1 is a partial schematic view, in axial section, of a turbofan-ramjet engine constructed in accordance with the invention.

The present invention will now be described in conjunction with the drawings beginning with FIG. 1 which shows a portion of a turbofan-ramjet engine 10 designed in accordance with the invention. Engine 10 includes a turbofan portion which may be of generally conventional design. The turbofan portion includes a front fan section 12, a compressor section 14, a combustor section 16 and a turbine section 18, each arranged in axial series.

A centerbody 20 of annular section extends axially along the radially inner surface of a main or core engine duct 22. An annular inner mid casing 24 defines the outer diameter of the main duct 22 along the compressor, combustor and turbine sections 14,16,18 of the turbofan portion of engine 10. An annular inner front casing 26 defines the outer diameter of the main duct 22 from the engine inlet 28, along the hollow front frame struts 30, along the fan section 12 and up to the core engine inlet 32.

An outer annular casing or nacelle 34 surrounds both the front casing 26 and mid casing 24 so as to define a front or forward bypass duct 36 and a mid bypass duct 38. A preburner 40 is mounted in the forward bypass duct 36 adjacent the front frame struts 30 and in general radial registry with the fan section 12. A main burner or augmenter 42 is mounted downstream of the mid bypass duct 38 and downstream of the turbine section 18.

A mid bypass valve 44 of conventional design is provided between the front casing 26 and the mid casing 24 to selectively meter the flow of fan air between the mid bypass duct 38 and the main or core engine duct 22. A similar forward bypass valve 46 is mounted adjacent to the inlet to the forward bypass duct 36 for selectively controlling the flow of inlet air into the forward bypass duct. Front and rear main duct valves 48,50 are respectively positioned to selectively close off the front inlet and rear outlet to the main duct 22.

During turbofan operation, forward bypass valve 46 is closed and valves 44,48 and 50 are opened to allow inlet air to enter the fan section 12 through inlet 28. The inlet air is compressed by the fan section and driven into the compressor section 14 via core engine inlet 32. A portion of the fan air enters the mid bypass duct 38 via mid bypass valve 44. This bypass air is mixed downstream with the hot exhaust gases exiting the turbofan turbine section 18 and fed to augmenter 42 where the mixed flow is combined with additional fuel and combusted.

It should be noted that, as the engine 10 operates in the turbofan mode, the preburner 40, which is effectively isolated from the fan airflow through mid bypass duct 38, does not present any obstacle or blockage to the fan airflow. Therefore, the preburner 40, as mounted in the forward bypass duct 36, does not create any pressure losses which would otherwise occur if the preburner were mounted in the mid bypass duct 38.

As the flight speed of the engine 10 approaches, for example, Mach 3, the front bypass valve 46 is opened. This allows inlet air to enter the front bypass duct 36 which, during normal turbofan operation, is completely isolated from the inlet air. At this time, fuel is fed through one or more fuel lines 52 to the preburner 40 where the fuel is combusted with a portion of the inlet air. The heated, combusted mixture of inlet air and preburner exhaust gas is then fed to the augmenter 42 via the mid bypass duct 38 to initiate ramjet operation in a known fashion.

At this transition between turbofan operation and ramjet operation, the turbofan section is closed off from the inlet air flow which is becoming increasingly hotter as the flight speed increases. The front and rear main duct valves 48,50 are closed as the turbofan operation is ceased. At this point, all of the inlet air enters the engine 10 through the front bypass duct 36 as the augmenter 42 begins to function as the main burner of the ramjet. The turbofan section is completely bypassed during ramjet operation.

Figure 2:
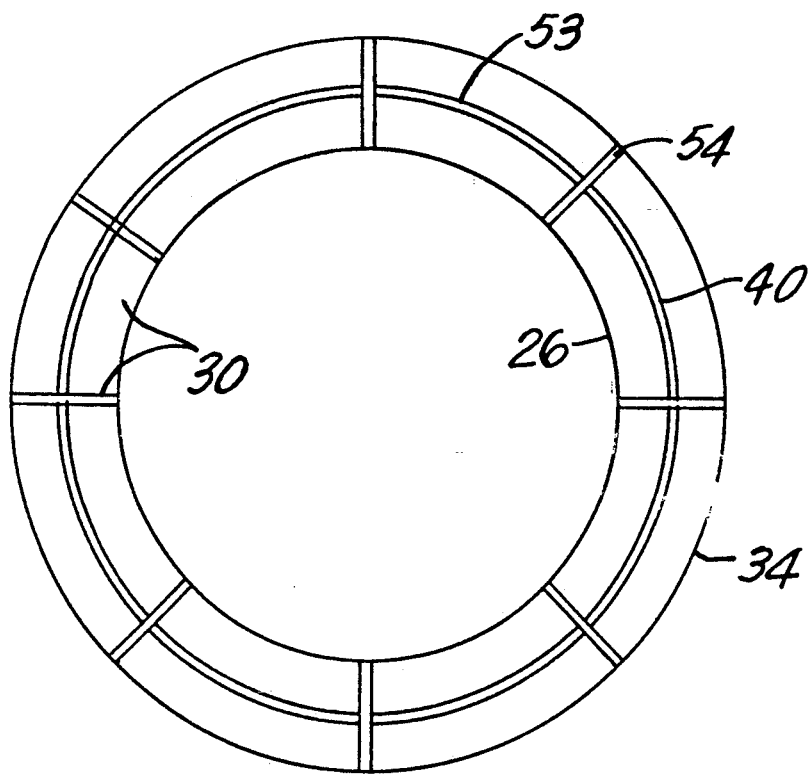
FIG. 2 is a schematic aft view looking forward along line 2—2 of FIG. 1 showing details of one embodiment of a strut-mounted preburner.

The preburner 40 can take the form of a separate annular member such as the circular V-ring 53 shown in FIG. 2. Although ring 53 provides a substantially continuous 360° ring of flame, such an apparatus could present a substantial blockage to ram airflow during ramjet operation. This, in turn, would result in pressure losses. In order to reduce or virtually eliminate such losses, the preburner 40 may be combined with the trailing edges 54 of the front frame struts 30 as shown in FIGS. 3, 4 and 5.

Figure 3:
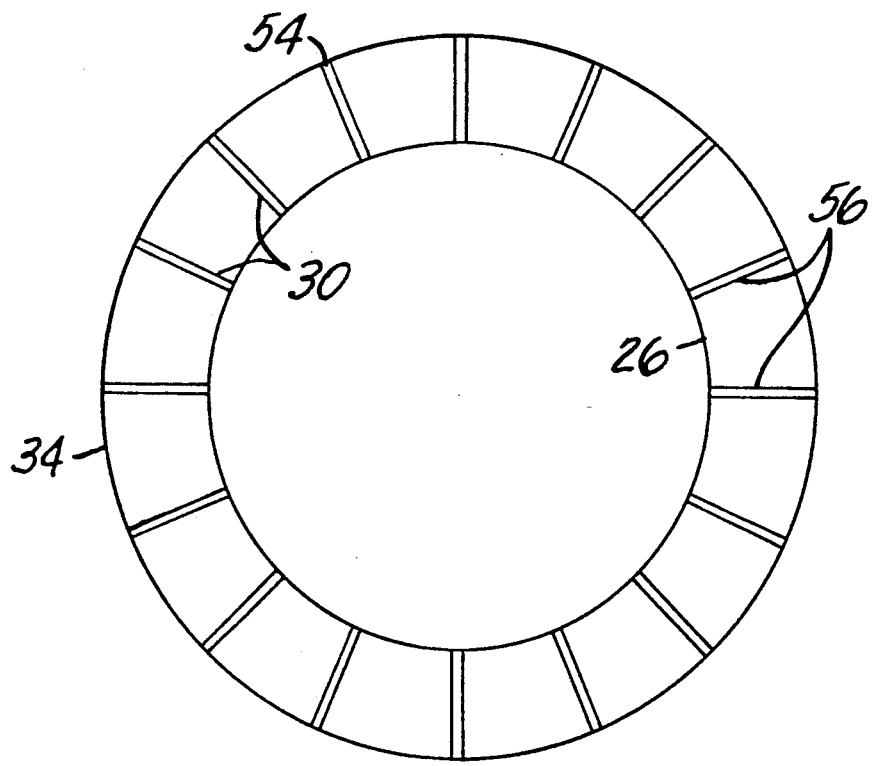
FIG. 3 is a view similar to FIG. 2 showing details of another embodiment of a strut-mounted preburner.

Thus, as depicted in FIG. 3, a circumferentially spaced, spoked array of, for example, 8, 12 or 16 hollow front struts 30 may include one or more preburner nozzles or flameholders 56 mounted directly to or within each of the front struts. In this manner, little or no additional blockage is presented to the ram airflow by the preburner 40.

Figure 4:
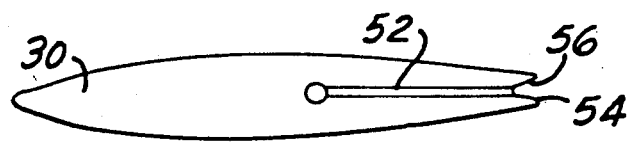
FIG. 4 is a schematic, sectional view of an integral front strut and a preburner according to the invention.
Figure 5:
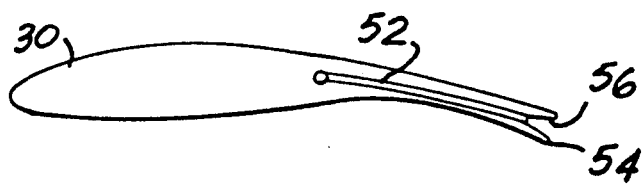
FIG. 5 is a schematic, sectional view similar to FIG. 2 depicting a cambered front strut in accordance with the invention.

A specific example of such an arrangement is shown in FIG. 4 wherein an airfoil sectioned front strut is formed with a V-shaped trailing edge which serves as one or more preburner nozzles 56. A similar but slightly modified front strut 30 is shown in FIG. 5 with a cambered contour which adds swirl to ram air as it flows past the struts. This swirl enhances the mixing of the inlet air with the hot preburner gases and allows for the design of a smaller and more compact preburner.

Figure 6:
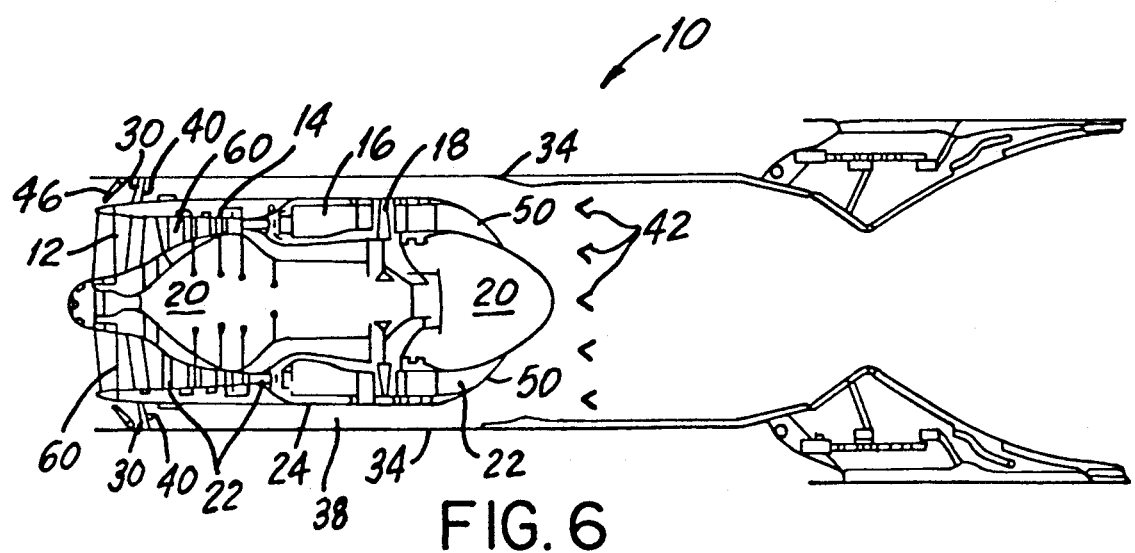
FIG. 6 is a view in axial section of another embodiment of a turbofan-ramjet engine constructed in accordance with the invention.

In the embodiment shown in FIG. 6, the main duct valve 48 may take the form of adjustable inlet guide vanes 60 which pivot about radial axes to open and close duct 22 in a known manner. The operation of this embodiment is essentially the same as that described above.

There has been disclosed heretofore the best embodiment of the invention presently contemplated. However, it is to be understood that various changes and modifications may be made thereto without departing from the spirit of the invention.

What is claimed is:

1. A jet engine, comprising:
   a turbofan section comprising a fan section, a compressor section, a combustor section, and a turbine section disposed in axial series;
   a main duct for admitting inlet air into said turbofan section;
   a mid bypass duct selectively communicating with said fan section for bypassing said inlet air around said compressor section, said combustor section and said turbine section;

a forward bypass duct selectively bypassing said inlet air around said turbofan section and into said mid bypass duct;

an augmenter disposed downstream of said main duct and said mid bypass duct; and preburner means provided in said forward bypass duct for preheating said inlet air, said preburner means being generally radially aligned with said fan section.

2. A jet engine, comprising:

a turbofan section comprising a fan section, a compressor section, a combustor section, and a turbine section disposed in axial series;

a main duct for admitting inlet air into said turbofan section;

a mid bypass duct selectively communicating with said fan section for bypassing said inlet air around said compressor section, said combustor section and said turbine section;

a forward bypass duct selectively bypassing said inlet air around said turbofan section and into said mid bypass duct;

an augmenter disposed downstream of said main duct and said mid bypass duct;

preburner means provided in said forward bypass duct for preheating said inlet air; and front strut means extending radially across said main duct and said forward bypass duct forward of said fan section, and wherein said preburner means is mounted to said front strut means.

3. The jet engine of claim 2, wherein said front strut means comprises a plurality of circumferentially spaced, hollow struts each comprising a trailing edge and wherein said preburner means comprises a plurality of individual preburners respectively mounted along each said trailing edge.

4. The jet engine of claim 3, wherein said hollow struts are formed with cambered profiles so as to impart a swirl to said inlet air.

5. A jet engine, comprising:

a turbofan section comprising a fan section, a compressor section, a combustor section, and a turbine section disposed in axial series;

a main duct for admitting inlet air into said turbofan section;

a mid bypass duct selectively communicating with said fan section for bypassing said inlet air around said compressor section, said combustor section and said turbine section;

a forward bypass duct selectively bypassing said inlet air around said turbofan section and into said mid bypass duct;

an augmenter disposed downstream of said main duct and said mid bypass duct;

preburner means provided in said forward bypass duct for preheating said inlet air; and a front duct valve for selectively admitting and blocking flow of said inlet air into said turbofan section and a forward bypass valve for selectively admitting and blocking flow of said inlet air into said forward bypass duct.

6. A turbofan-ramjet engine, comprising:

a turbofan section;

a main duct extending through said turbofan section;

a mid bypass duct selectively communicating with said main duct;

a forward bypass duct communicating with said mid bypass duct;

an augmenter disposed downstream of said turbofan section; and preburner means provided in said forward bypass duct;

wherein said forward bypass duct surrounds a forward portion of said main duct and interfaces with said mid bypass duct proximate a core engine inlet of said turbofan-ramjet engine.

7. The engine of claim 6, further comprising a forward bypass valve provided in said forward bypass duct for controlling airflow therethrough and wherein said turbofan section comprises a fan section and said preburner means is generally radially aligned with said fan section.

8. A turbofan-ramjet engine, comprising:

a turbofan section;

a main duct extending through said turbofan section;

a mid bypass duct selectively communicating with said main duct;

a forward bypass duct communicating with said mid bypass duct;

an augmenter disposed downstream of said turbofan section;

preburner means provided in said forward bypass duct; and strut means extending across said main duct and said forward bypass duct, and wherein said preburner means is mounted to said strut means.

9. A method of transitioning a turbojet-ramjet engine from turbofan operation to ramjet operation, said engine comprising a valved main duct, a mid bypass duct extending axially around a mid portion of said main duct, a valved front bypass duct extending axially around a front portion of said main duct, a preburner provided in said forward bypass duct and an augmenter provided downstream of said mid bypass duct, and wherein said method comprises:

blocking inlet air from entering said main duct;

admitting inlet air into said front bypass duct;

heating said inlet air in said front bypass duct with said preburner means; and channeling said inlet air from said preburner means to said augmenter via said mid bypass duct.

10. The method of claim 1, further comprising combusting said inlet air from said preburner in said augmenter and terminating said turbofan operation.

* * * * *